Figure 1:
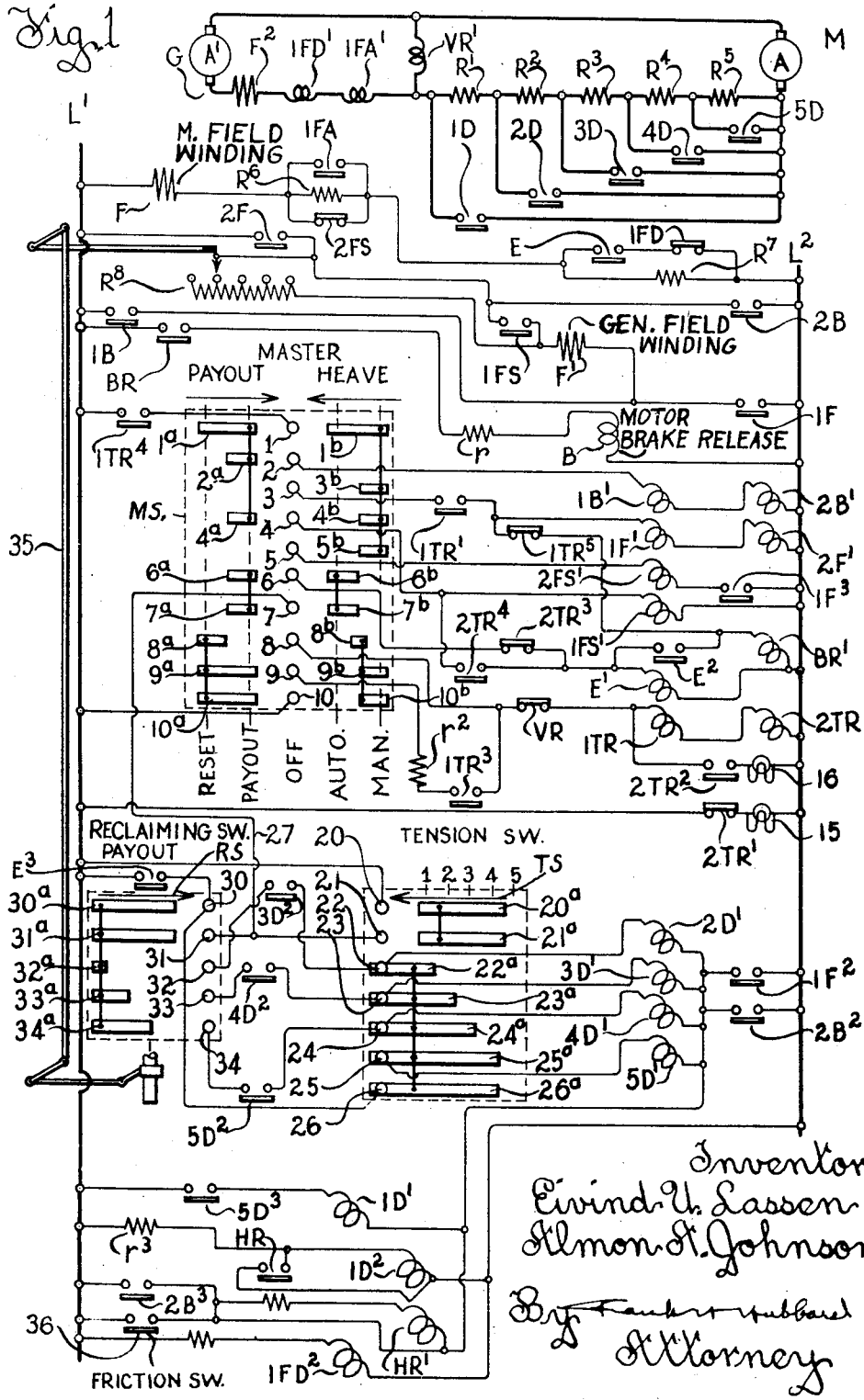

April 3, 1945. E. U. LASSEN ET AL 2,372,933
CONTROLLER FOR TOWING WINCHES AND OTHER MACHINES
Filed Sept. 8, 1941 3 Sheets-Sheet 1

Inventors
Eivind U. Lassen
Almon A. Johnson
By Frank R. Hubbard
Attorney

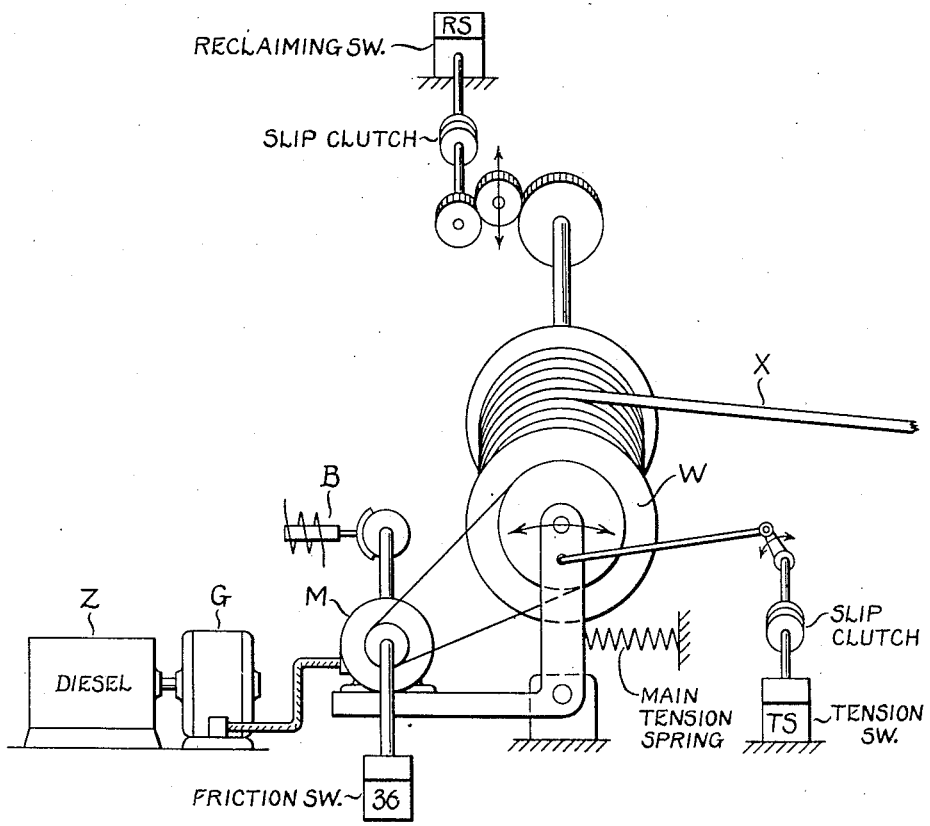

Patented Apr. 3, 1945

2,372,963

UNITED STATES PATENT OFFICE 2,372,963

CONTROLLER FOR TOWING WINCHES AND OTHER MACHINES

Eivind U. Lassen, Whitefish Bay, Wis., and Almon A. Johnson, Forest Hills, N. Y.; said Lassen assignor to Cutler-Hammer, Inc., Milwaukee, Wis., a corporation of Delaware Application September 8, 1941, Serial No. 410,070

15 Claims. (Cl. 254—172)

This invention relates to control for towing winches.

Control embodying the present invention is especially advantageous for a towing machine having its driving motor supplied by a Diesel engine driven generator, the Diesel engine being capable of absorbing only a limited amount of regenerative energy (about 30 per cent of its rating). As will be understood, the towing machine preferably is controllable at will to pay out and reel in the towing line, whereas it is also desired to have it pay out automatically but not too freely in response to surges resulting from a heavy sea and to have it reel in or reclaim automatically as the surges pass. Commonly the machine is provided with a clutch connected tension switch which responds as the tension on the towing line increases above a certain value and which moves to different positions successively as the tension further increases, preferably taking a definite final position for a given tension or any greater tension. Also the towing machine to which the present invention is particularly applicable is equipped with a reclaiming switch which may be assumed to be driven from the winding drum through a slip clutch, said switch measuring the paid-out line to be reclaimed but only up to a given length which if exceeded results in arrest of the reclaiming switch in a definite final position, the arrest of the switch being made possible by slipping of its slip clutch.

An object of the present invention is to provide improved control means for towing winches including those of the character aforementioned which will afford variable voltage control and automatic graduation of dynamic braking resistance to avoid the high regenerative braking which could not be absorbed by a Diesel engine such as it is desired to employ.

Another object is while keeping the load on the Diesel engine within predetermined limits, to afford for heavier surges faster pay-out, the retarding torque being increased for the heavier surges.

Another object is to insure against loss of retarding power even momentarily upon termination of pay-out and commencement of reclaiming or vice versa.

Another object is to provide generator characteristics such that the load on the Diesel engine in reclaiming will be kept within safe limits regardless of tension on the towing line or even stalling of the motor, whereas for light loads the motor will be caused to operate at a speed to reclaim quickly the paid-out line.

Another object is to render increase in retarding force a function of operation of the reclaiming switch, or, in other words, a function of the amount of pay-out.

Another object is through provision of the generator with a differential field winding to so govern the inrush peaks incident to short circuiting of the dynamic braking resistances as to avoid reaction on the tension switch to effect reinsertion of the resistor just short circuited, or, in other words, to avoid an effect on the tension switch comparable to a surge calling for pay-out.

Another object is to utilize the aforementioned differential field winding of the generator for cumulative action when the towing line is paid out manually thereby to effect response of a voltage relay in turn subjecting the pay-out to automatically controlled retardation.

Various other objects and advantages of the invention will hereinafter appear.

One embodiment of the control constituting the present invention is illustrated in the accompanying drawings which will now be described, it being understood that the invention may be embodied in various other forms without departing from the scope of the appended claims.

In the drawings,

Figure 1 is a diagrammatic view of the control system.

Figure 2:
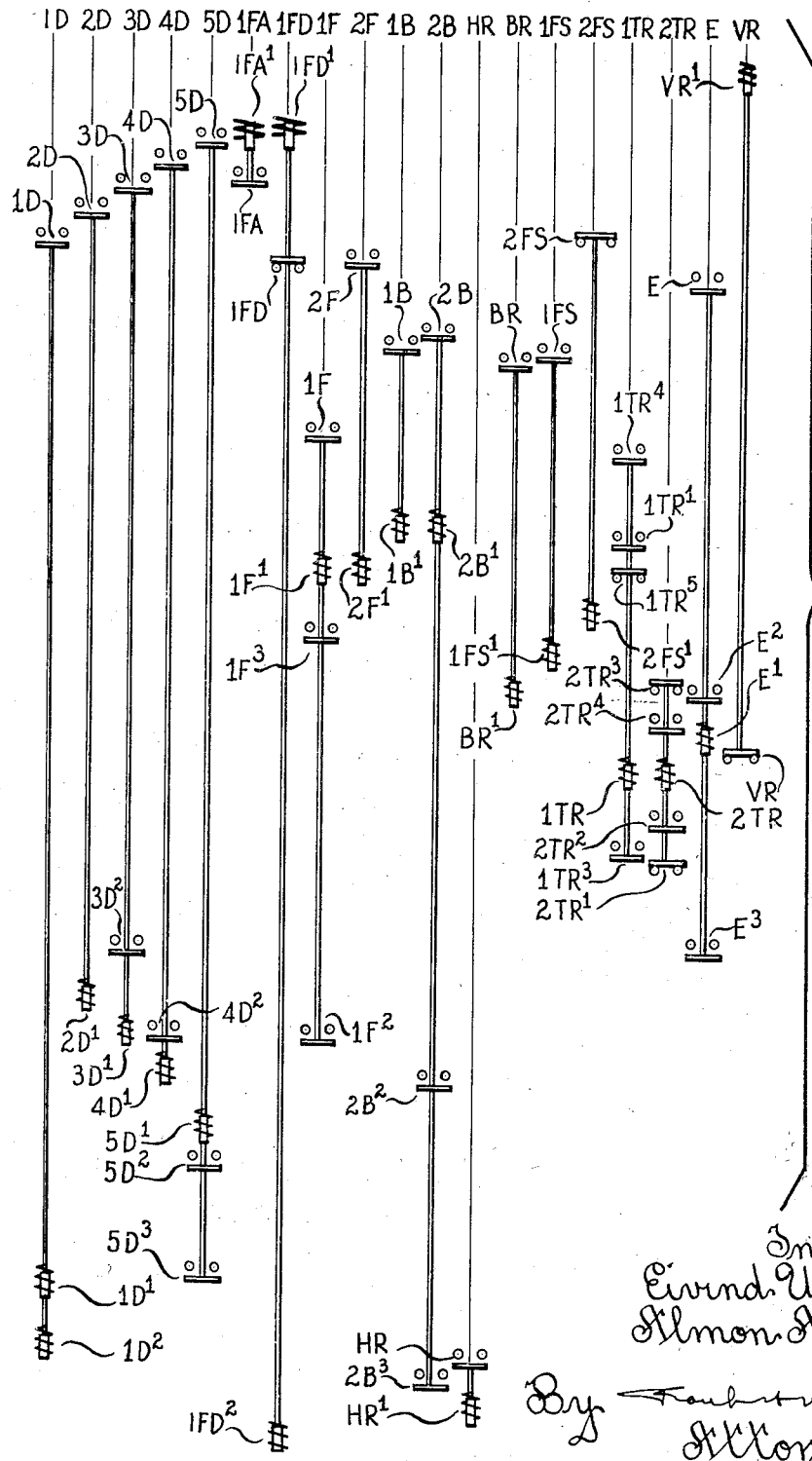

Fig. 2 is a chart showing in vertical alinement the coil or coils and the contact or contacts of each of the electro-responsive switches of Fig. 1, the coils and contacts of Fig. 2 being alined horizontally with the like coils and contacts of Fig. 1, and Fig. 3 is a schematic showing of a motor-driven winch having associated therewith certain of the control elements of Fig. 1, this schematic showing including between the drum and the upper slip clutch gearing having a pinion to move up or down, as indicated by the arrows, upon shifting of the drum, thereby to preserve the drive afforded by such gearing.

Referring to the drawings, particularly Fig. 3, there is shown a motor M for driving a winding drum W for the towing line X, said motor comprising an armature A and a separately excited field winding F, the former being supplied by generator G and the latter from lines $L^1$, $L^2$. As will be understood, the driving connections between the motor M and the winding drum provide for driving of the motor by the drum when the tension on the towing line is sufficient, although it will be also understood that the driving connection may be made interruptable if desired for temporarily freeing the drum from the motor.

The generator G may be operated by a suitable Diesel engine Z and has its armature $A^1$ connected in a closed loop with the armature A of motor M. The generator has a separately excited field winding $F^1$ supplied from lines $L^1$, $L^2$ and also a series field winding $F^2$ connected in the motor generator loop, said winding $F^2$ acting cumulatively with winding $F^1$ under certain conditions and differentially under other conditions.

The loop for the motor and generator armatures also includes resistors $R^1$, $R^2$, $R^3$, $R^4$, $R^5$ controlled respectively by normally open switches 1D, 2D, 3D, 4D, 5D to avoid need of the Diesel engine absorbing all of the regenerative energy when the motor M is overhauled by the winding drum, said switches being electroresponsive and operating automatically, as will later appear. Also the loop for the motor and generator armatures includes series coils $1FD^1$ and $1FA^1$ for purposes hereinafter set forth, whereas said loop has connected across the same a voltage relay coil $VR^1$.

The motor field winding F is connected across lines $L^1$, $L^2$ through resistors $R^6$ and $R^7$, which resistors have short-circuiting switches hereinafter described including a normally open switch 1FA controlled by the aforementioned coil $1FA^1$ and a normally closed switch 1FD partially controlled by the aforementioned coil $1FD^1$.

The generator field winding $F^1$ is adapted to be connected across lines $L^1$, $L^2$ through reversing switches 1F—2F or reversing switches 1B—2B whereby its polarity may be controlled for reversals of the flow of current through the armature of motor M. In series with the generator field winding $F^1$ is included an adjustable rheostat $R^8$ having a normally open short-circuiting switch 1FS controlled as hereinafter set forth. The rheostat $R^8$ preferably is adjustable by an automatic control device later referred to.

The motor M is preferably provided with an electromagnetically controlled brake and a coil B for withdrawing or releasing such brake is shown as supplied by lines $L^1$, $L^2$ through a resistance $r$ and a normally open control switch BR controlled as hereinafter described.

For control of aforementioned and other electroresponsive switches three drum type controllers are shown, namely a master switch MS, a tension switch TS and a reclaiming switch RS. The MS drum is operable manually while the TS and RS drums are operatively connected to the winch by suitable means as for example the slip clutch connections schematically shown in Fig. 3, the first operating in response to variations in tension on the towing line, and the second operating in response to pay-out, as explained at the outset. Each of the three drums comprises a series of contact fingers and segments to cooperate therewith.

The MS drum comprises a series of contact fingers 1 to 10, inclusive, and two vertically divided sets of segments all disengaged from said fingers in the off position of said drum. At the left of the contact fingers are segments $1^a$, $2^a$, $4^a$, $6^a$, $7^a$, $9^a$ and $10^a$ to engage fingers 1, 2, 4, 6, 7, 9 and 10, respectively, when the drum is moved in pay-out direction to its first operative or pay-out position. Also at the left of the contact fingers is a segment $8^a$ to engage finger 8 when the drum is moved further in pay-out direction to its second or reset position wherein the segments $2^a$, $4^a$, $6^a$ and $7^a$ are again disengaged from their respective contact fingers. At the right of the series contact fingers are segments $1^b$, $6^b$ and $7^b$ to engage contact fingers 1, 6 and 7 when the drum is moved in heave direction to its first operative or automatic position. Also to the right of the contact fingers are segments $3^b$, $4^b$, $5^b$, $9^b$ and $10^b$ to engage fingers 3, 4, 5, 9 and 10 when the drum is moved further in heave direction to its second or manual position wherein the segments $6^b$ and $7^b$ are again disengaged from their respective fingers. Also to the right of the contact fingers is a segment $8^b$ which engages and then disengages contact finger 8 during movement of the drum from automatic position to manual position or vice versa.

The MS drum controls the field reversing switches 1F, 2F, 1B and 2B through coils $1F^1$, $2F^1$, $1B^1$ and $2B^1$, respectively. The coils $1B^1$ and $2B^1$ are in series and are connected to contact finger 2, while the coils $1F^1$ and $2F^1$ are in series and connected to contact finger 3 through normally open contacts $1TR^1$ of a transfer relay 1TR controlled in a manner later explained. Also the MS drum controls the coils $2FS^1$ and $1FS^1$, respectively, having contacts 2FS and 1FS associated with aforementioned resistors in the circuits of the separately excited field windings of the motor M and generator G. Such contacts 2FS are normally engaged to short circuit resistor $R^6$ in the field circuit of the motor while the contacts 1FS are normally disengaged but when engaged short circuit the rheostat $R^8$ in the circuit of the generator field winding $F^1$. The coil $1FS^1$ is connected to MS drum finger 4 for energization in either the manual heave or the pay-out positions of the drum while the coil $2FS^1$ is connected to drum finger 5 for energization only in the manual heave position of the drum and only after switch 1F has responded to close its auxiliary contacts $1F^3$ in circuit between coil $2FS^1$ and line $L^2$. Also the MS drum controls relay coil $E^1$, this coil through contacts E controlling a shunt for resistor $R^7$ in the field circuit of the motor. Also coil $E^1$ engages contacts $E^2$ completing circuit for coil $BR^1$ which through closure of contacts BR completes circuit for the brake coil B. Control of the coils $E^1$ and $BR^1$ is shared by the other drum switches hereinafter described, and hence further description of the circuits of these coils will be deferred. Additionally the drum MS controls the transfer relay coils 1TR and 2TR, which coils it will be noted are in series and are connected to drum contact finger 8 through normally closed voltage relay contacts VR, whereas they are adapted to be connected to contact finger 9 through normally open contacts $1TR^3$ of transfer relay 1TR and a resistor $r^2$. Transfer relay 2TR has normally closed contacts $2TR^1$ in series with a lamp 15 and acts to connect it directly across lines $L^1$, $L^2$, whereas it has normally open contacts $2TR^2$ which when closed complete circuit for a lamp 16 in parallel with the 1TR and 2TR coils, the lamp 15 being then disconnected from the circuit. Additional contacts of the transfer relays are as follows:

Normally disengaged contacts $1TR^4$ controlling a connection between line $L^1$ and drum finger 1.

Normally engaged contacts $1TR^5$ between contacts $1TR^1$ and brake relay coil $BR^1$.

Normally engaged contacts $2TR^3$ between drum finger 6 and relay coil $E^1$.

Normally disengaged contacts 2TR⁴ between drum finger 4 and relay coil E¹.

The tension drum or switch TS comprises a series of contact fingers 20, 21, 22, 23, 24, 25 and 26 and a set of cooperating segments 20ª, 21ª, 22ª, 23ª, 24ª, 25ª and 26ª. In the normal position of the drum segments 22ª, 23ª, 24ª, 25ª and 26ª engage contact fingers 22, 23, 24, 25 and 26, respectively, and in position 1 the aforementioned segments remain in engagement with their respective fingers, whereas segments 20ª and 21ª engage fingers 20 and 21, respectively. In position 2 segment 22ª disengages finger 22, while in position 3 segment 23ª disengages finger 23. In position 4 segment 24ª disengages finger 24, and in position 5 all segments disengage all contact fingers. Contact finger 20 is connected to line L¹ while contact finger 21 is connected by conductor 27 to contact finger 7 of the MS drum. Contact fingers 22, 23, 24 and 25 are respectively connected to aforementioned resistance switch coils 2D¹, 3D¹, 4D¹ and 5D¹, which coils have a common connection to line L² through normally open auxiliary contacts 1F² of reversing switch 1F or like contacts 2B² of reversing switch 2B. The contact finger 26 is connected to a contact finger 30 of the reclaiming drum and thence through normally open contacts E³ of relay E to line L¹. The segments 20ª and 21ª are interconnected while the contact segments 22ª, 23ª, 24ª, 25ª and 26ª are interconnected.

The reclaiming drum or switch RS comprises a series of contact fingers 30, 31, 32, 33 and 34, and interconnected segments 30ª, 31ª, 32ª, 33ª and 34ª to engage said fingers respectively. The contact finger 30 is the finger connected to the tension switch drum finger 26 and the remaining fingers of the reclaiming drum also have connections with contact fingers of the tension switch. The contact finger 31 has a direct connection with finger 21. Contact finger 32 is connected with finger 22 through normally open auxiliary contacts 3D² of the resistance switch 3D, while finger 33 is connected to finger 23 through normally open contacts 4D² of resistance switch 4D, and finger 34 is connected to finger 24 through the normally open contacts 5D² of resistance switch 5D. When the reclaiming drum is moved in the pay-out direction segments 30ª and 31ª first engage fingers 30 and 31, respectively. Then as the drum continues to move in the pay-out direction segments 34ª, 33ª and 32ª successively engage fingers 34, 33 and 32. This movement of the reclaiming drum is also utilized to adjust the rheostat R⁸ in the field circuit of the generator and to make clear this coordination of the reclaiming drum and the rheostat mechanical interconnections 35 have been schematically shown.

The resistance control switch 1D differs from the remaining resistance control switches in that it has an operating coil designated as 1D¹ and a hold-out coil designated as 1D². As will be understood, when both coils are energized the switch is restrained against response, whereas upon short-circuiting of the hold-out coil and continued energization of the operating coil the switch is rendered responsive, this being a well known type of time element switch. As shown, the operating coil 1D¹ is adapted to be connected to line L¹ by normally open auxiliary contacts 5D³ of switch 5D, and to line L² by normally open auxiliary contacts 1F² of reversing switch 1F or normally open contacts 2B² of reversing switch 2B. On the other hand, coil 1D² is connected directly across the line through a resistor r³, being subject to short-circuiting by normally open contacts HR of a relay having an operating coil HR¹ adapted to be connected to line L¹ by auxiliary contacts 2B³ of reversing switch 2B and to line L² by auxiliary contacts 2B² of the same reversing switch. Alternatively the coil HR¹ of relay HR may be connected to line L¹ by a friction switch 36 which closes when the drum moves in heave direction and opens when the drum pays out. In Fig. 3 the friction switch 36 is for convenience shown as operatively connected to the drum indirectly, said switch being shown as connected to the shaft of motor M.

The coil 1FD² shown below the coil HR¹ is a second and main coil of the 1FD relay hereinbefore mentioned having a coil 1FD¹ in the loop of the armatures of the motor and generator. The latter coil at times acts cumulatively with the former coil and at other times acts differentially therewith for control of contacts 1FD in a shunt around resistor R⁷ in the field circuit of the motor.

With the several drums in the positions illustrated initial pay-out of the towing line may be effected by moving the MS drum in pay-out direction to reset position, and then back to pay-out position. The drum MS in reset position completes circuit from line L¹ to drum finger 10 to and through segments 10ª and 8ª to finger 8, and thence through normally closed contacts VR to and through coils 1TR and 2TR to line L². The transfer relays thus respond and establish for themselves a maintaining circuit through contacts 1TR³, resistance r² and drum contacts 9, 9ª, 10ª and 10 to line L¹ whereby said transfer relays will remain energized when the drum is returned to pay-out position. When the drum returns to pay-out position it completes energizing circuits for coils 1B¹, 2B¹, 1FS¹ and E¹. The supply to coils 1B¹ and 2B¹ extends from line L¹ through now engaged contacts 1TR⁴ to and through drum contacts 1, 1ª, 2ª and 2. The supply for coil 1FS¹ extends from finger 4 which through segments 4ª and 1ª is connected to drum finger 1 while the supply for coil E¹ also extends from drum finger 4 through now engaged contacts 2TR⁴. Thus reversing switches 1B and 2B respond to energize the generator field F¹ to effect starting of the motor in pay-out direction, whereas relay E in responding connects coil BR¹ in parallel with coil E¹ for response of the BR relay to effect energization of the motor brake coil B. The circuit for the generator field F¹ is under the conditions described exclusive of the rheostat R⁸ because of energization and response of switch 1FS, but of course the generator field does not at once attain full strength and the initial inrush to the motor is reduced by the resistance included in circuit between the generator and motor armatures. When relay E closes its contacts E³ complete a circuit from L¹ to and through interconnected fingers 30 and 26 of the RS and TS drums and drum contacts 26, 26ª, 25ª and 25 to coil 5D¹ which is now connected to line L² through contacts 2B². 5D thus responds and through its contacts 5D³ completes the circuit of coil 1D¹ which causes response of 1D subject to the time element afforded by the hold-out coil 1D² under the control of the HR relay as hereinbefore explained. Thus when the motor is started a given value of resistance is included in series therewith, whereas the resistance is then automatically excluded and acceleration proceeds under the combined control of the now differentially acting field windings $F^1$ and $F^2$ of the generator. Also the motor is subject to further acceleration by field weakening through inclusion of resistance $R^7$ under control of $1FD$ whose coils $1FD^1$ and $1FD^2$ are cumulative for manual pay-out. If, however, the motor is overhauled at this higher speed, then coils $1FD^1$ and $1FD^2$ act differentially to effect release of switch $1FD$ for reclosure of the shunt around motor field resistor $R^7$ for field strengthening.

During such paying-out of the towing line the reclaiming switch RS is moved away from normal position, and preferably it is designed to move throughout its full range when 50 feet of line has been paid out during which time the generator field has attained full strength. Thus upon further pay-out to the usual length of 1800 ft. the reclaiming switch will remain in its extreme position last mentioned. In practice the reclaiming switch may be designed for manual reset to its normal or initial position after the desired length of line has been payed out, thereby to prevent the BS drum from operating to reclaim a portion of the normal length (1800 feet) of line.

Should the towing line while being payed-out be subjected to pull, causing it to pay out too fast, then the $VR^1$ coil will act on the regenerated overvoltage to open contacts VR to deenergize coils $1TR$ and $2TR$, transferring from manual control to automatic control, which will be later explained. Such overvoltage will rise rapidly because the generator field windings will act cumulatively.

An alternative method of paying out initially is to set the MS switch for automatic control and release the winding drum from the motor, letting the towing line pay out by the tug propelling away from the tow to the desired length, and then reconnecting the winding drum and motor, whereupon the control becomes automatic.

When the towing line has been payed out to normal length the MS drum is thrown to its automatic position, deenergizing $1TR$ and $2TR$ which results in deenergizing coils $1B^1$, $2B^1$ and $BR^1$ to stop the motor and set its brake.

Then if a surge occurs exerting an abnormal pull on the towing line the TS drum will move to its position 1 to energize $E^1$ which is followed by energization of $1F^1$, $2F^1$ and $BR^1$. Under these conditions the left hand terminal of coil $E^1$ has a connection through contacts $2TR^3$ and MS contacts 6, $6^b$, $7^b$, 7 by conductor 27 to TS contact 21 through contacts $21^a$, $20^a$, 20 to line $L^1$. As hereinbefore explained, $E^1$ when energized engages contacts $E^2$ to connect $BR^1$ in circuit. Also contacts $E^2$ complete a circuit from the supply of coil $E^1$ to and through contacts $1TR^5$ to $1F^1$ and $2F^1$. Thus $1F^1$ and $2F^1$ respond to complete the circuit of generator field winding $F^1$ for current flow in a direction reverse to that previously considered, and the motor brake is released, whereby the motor is caused to operate in direction opposing pay-out of the towing line. Also at this time coils $2D^1$, $3D^1$, $4D^1$ and $5D^1$ are energized to cause switches 2D, 3D, 4D and 5D to exclude resistors $R^2$, $R^3$, $R^4$ and $R^5$ from the loop of the motor and generator armatures, resistor $R^1$ remaining in circuit to absorb the regenerative energy. If the surge increases sufficiently the TS switch will progressively disengage contacts 22—$22^a$, 23—$23^a$, 24—$24^a$, 25—$25^a$ to deenergize switches 2D, 3D, 4D and 5D for reinclusion of the resistors controlled thereby, this permitting a higher pay-out speed with a limited increase in the retarding torque. As the surge decreases TS will reclose progressively the 5D, 4D, 3D and 2D switches and hence keep the retarding torque and subsequently the reclaiming torque at the desired value.

When the motor begins to reclaim the payed out line the friction switch 36 closes to complete the circuit of coil $HR^1$ which then closes contacts HR to short-circuit the hold out coil $1D^2$ of resistance switch $1D$. Thus after lapse of a time element switch $1D$ responds to exclude all resistance, whereby the full generator output is available for reclaiming.

The RS drum during pay-out acts on the generator field rheostat $R^3$ as hereinbefore explained to gradually increase the field excitation of the generator. Also if the TS drum has not energized all of the resistance switches 2D to 5D the RS drum will do so, which will gradually increase the retarding torque as the towing line is payed out. However, should a second surge occur, strong enough to move tension switch TS to position 5 switch 5D will be deenergized and will effect deenergization of 4D, 3D, 2D through the medium of contacts $5D^2$, $4D^2$, $3D^2$ included in the cross connections of the RS and TS drums. This will permit paying out line at reduced torque.

Heaving of a loaded line may be accomplished either by setting the system for automatic operation at a tension supplied by the existing load or manually by moving MS in heave direction to manual position. In the movement of MS from its automatic to its manual position its contacts 8 and $8^b$ momentarily energize coils $1TR$ and $2TR$ which establish for themselves a maintaining circuit like that hereinbefore described except that it now extends through contacts 9, $9^b$, $10^b$, 10. Through contacts $1TR^4$, drum contacts 1, $1^b$, $3^b$, 3 and contacts $1TR^1$ circuit is closed through coils $1F^1$ and $2F^1$ for connection of generator field $F^1$. Also circuit is completed from drum contact 1 and contacts $1^b$, $4^b$, 4 and $2TR^4$ through coil $E^1$ which closes contacts $E^2$ to energize $BR^1$ as hereinbefore explained. Also circuit is completed from the drum contact 4 to and through coil $1FS^1$. Thus the generator supplies power to the motor for operating the latter in heave direction and coil $1FS^1$ responds to shunt the generator field rheostat through switch $1FS$.

Additionally circuit is completed from drum contact 1 through $1^b$, $5^b$ and 5 to and through coil $2FS^1$ to and through contacts $1F^3$ to line $L^2$. Thus contacts $2FS$ are caused to open to include resistor $R^6$ in circuit with the motor field F for rapid pull in of an unloaded line. Should the line be loaded then coil $1FA^1$ in the armature loop would respond to close contacts $1FA$ to shunt resistor $R^6$.

What we claim as new and desire to secure by Letters Patent is:

1. In a control system for motor operated towing winches and other machines, in combination, a driving motor subject to overhauling by the controlled machine, a supply generator therefor, a Diesel engine for driving said generator, a closed loop including the armatures of said motor and generator, resistance for said loop to absorb regenerative energy of said motor, and means affording automatic regulation of said resistance and including means sensitive to variation in strain on the controlled machine during regenerative action of said motor.

2. In a control system for motor operated towing winches and other machines, in combination, a driving motor for the controlled machine, a supply generator therefor having a separately excited field and a series field, a closed loop including the armatures of said motor and said generator and also the series field of said generator, resistance for said loop to absorb regenerative energy of said motor, and means sensitive to variation in strain on the controlled machine to regulate said resistance during regenerative action of said motor.

3. In a control system for motor operated towing winches and other machines, in combination, a driving motor for the driven machine, a Diesel engine driven generator, a closed loop including the armatures of said motor and generator, resistance for said loop to absorb regenerative energy of said motor and means to regulate said resistance during regenerative action of said motor, said means including a tension measuring means and means responsive thereto to increase said resistance gradually with increasing tension and vice versa.

4. In a control system for motor operated towing winches, in combination, a driving motor for the controlled machine, a supply generator therefor having a separately excited field and a series field, a closed loop including the armatures of said motor and said generator and also the series field of said generator, resistance for said loop to absorb regenerative energy of said motor, and means to regulate said resistance during regenerative action of said motor, said means including a line tension measuring means and means responsive thereto to increase said resistance gradually with increasing line tension and vice versa.

5. In a controller for motor operated towing winches and other machines wherein the motor is at times driven as a generator, in combination, a motor, a supply generator therefor, a loop including the armatures of said motor and said generator, resistance for said loop to absorb regenerative energy of said motor, control means affording manual control and automatic control including automatic control of said resistance as a function of given operating conditions, and a voltage relay associated with said loop to effect transfer from manual control to automatic control if given operating conditions occur while manual control is exercised.

6. In a controller for motor operated towing winches and other machines wherein the motor is at times driven as a generator, in combination, a motor, a supply generator therefor having a separately excited field and a series field, a loop including the armatures of said motor and said generator and said series field of said generator, resistance for said loop to absorb regenerative energy of said motor, and control means affording manual control and automatic control including automatic adjustment of said resistance as a function of given operating conditions, and a voltage relay associated with said loop to effect transfer from manual control to automatic control if given operating conditions occur while manual control is exercised.

7. In a controller for motor operated towing winches and other machines wherein the motor is at times driven as a generator, in combination, a motor, a supply generator therefor, a loop including the armatures of said motor and said generator, resistance for said loop to absorb regenerative energy of said motor, and control means affording manual control and automatic control including automatic control of said resistance as a function of given operating conditions, said means including means controllable at will for transfer from manual control to automatic control and also means responsive under given operating conditions to control said transfer means for transfer automatically.

8. In a controller for motor operated towing winches and other machines wherein the motor is at times driven as a generator, in combination, a motor, a generator having a separately excited field and a series field, a loop including the armature of said motor and the armature and series field of said generator, resistance for said loop to absorb regenerative energy of said motor, and control means affording certain manual control and certain automatic control including automatic control of said resistance as a function of given operating conditions, said means including means controllable at will for transfer from manual control to automatic control and also means responsive under given operating conditions to control said transfer means for transfer automatically.

9. In a controller for motor operated towing winches wherein the motor is at times driven as a generator, in combination, a motor, a generator, a loop including the armatures of said motor and said generator, resistance for said loop to absorb regenerative energy of said motor and automatic graduating means for said resistance including a device responsive to tension on the towing line in excess of a predetermined value and a device responsive to pay-out of the towing line, said devices being coordinated whereby under certain operating conditions the normal resistance controlling effects of one are modified by the other.

10. In a controller for motor operated towing winches wherein the motor is at times driven as a generator, in combination, a motor, a generator having a separately excited field winding and a series field winding, a loop including the armatures of said motor and said generator and also the series field winding of said generator, resistance for said loop to absorb regenerative energy of said motor, and automatic means for graduating said resistance automatically including a device responsive to tension on the towing line in excess of a predetermined value and a device responsive to pay-out of the towing line.

11. In a controller for motor operated towing winches wherein the motor is at times driven as a generator, in combination, a motor, a generator having a separately excited field winding and a series field winding, a loop including the armatures of said motor and said generator and also the series field winding of said generator and resistance, and automatic control means including graduating means for said resistance, to render the generator effective when the tension on the towing line exceeds a predetermined value to supply power to said motor tending to cause the latter to operate in a direction to reclaim the towing line and thus to retard pay-out of the line under tension, said control means including tension measuring and pay-out measuring devices affording graduation of said resistance.

12. In a controller for motor operated towing winches wherein the motor is at times driven as a generator, in combination, a motor, a generator having a separately excited field winding and a series field winding, a loop including the armatures of said motor and said generator and also the series field winding of said generator and resistance, and automatic control means including graduating means for said resistance, to render the generator effective when the tension on the towing line exceeds a predetermined value to supply power to said motor tending to cause the latter to operate in a direction to reclaim the towing line and thus to retard pay-out of the line under tension, said means including tension measuring and pay-out measuring devices affording graduation of said resistance, said tension measuring device tending to increase said resistance with increase in tension, and said pay-out measuring device tending to decrease said resistance with pay-out of the towing line.

13. In a controller for motor operated towing winches wherein the motor is a times driven as a generator, in combination, a motor, a generator having a separately excited field winding and a series field winding, a loop including the armatures of said motor and said generator and also the series field winding of said generator, resistance for said loop and control means affording manual control of said generator to cause said motor to operate for pay-out of line or alternatively affording control of said generator and the resistance of said loop to cause said motor to oppose pay-out and to reclaim automatically, said control means including a tension responsive device and a reclaiming device both affording graduation of said resistance, and said control means further including transfer means to effect automatically under predetermined conditions transfer from manual to automatic control.

14. In a controller for motor operated towing winches wherein the motor is at times driven as a generator, in combination, a motor, a generator having a separately excited field winding and a series field winding, a loop including the armatures of said motor and said generator and also the series field winding of said generator, resistance for said loop and control means affording control of said generator for supply of current to said motor armature to traverse the latter in either direction, and further affording graduation of said loop resistance and also the field strength of said generator, said control means including tension measuring and pay-out measuring devices controlling said loop resistance, said pay-out measuring device also having an influence on the action of said control to vary the field strength of said generator.

15. In a controller for motor operated towing winches wherein the motor is at times driven as a generator, in combination, a motor, a generator having a separately excited field winding and a series field winding, a loop including the armatures of said motor and said generator and also the series field winding of said generator, resistance for said loop and control means affording control of said generator for supply of current to said motor armature to traverse the latter in either direction and further affording graduation of said loop resistance and also the field strength of said motor, said means including for control of the motor field strength electroresponsive means subjected to influence by the current flow in said loop.

EIVIND U. LASSEN.
ALMON A. JOHNSON.